July 20, 1937.   R. E. NEWELL   2,087,443
OVEN CONTROL UNIT
Filed Feb. 24, 1937
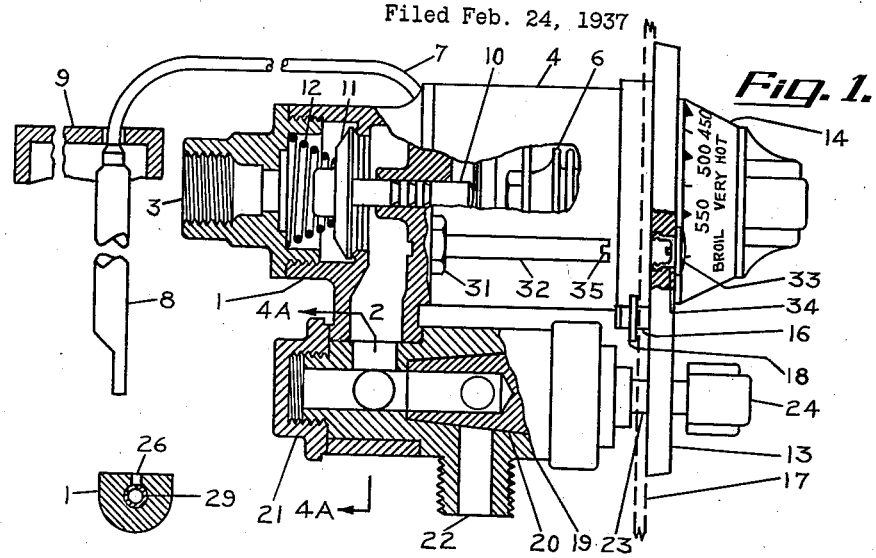
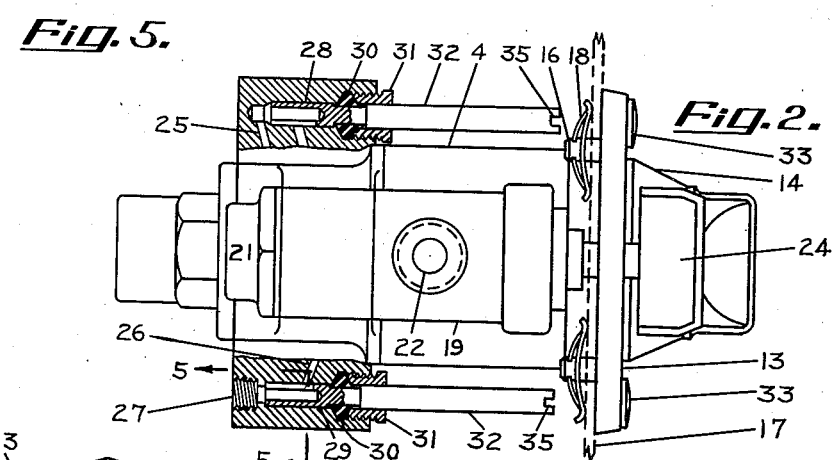
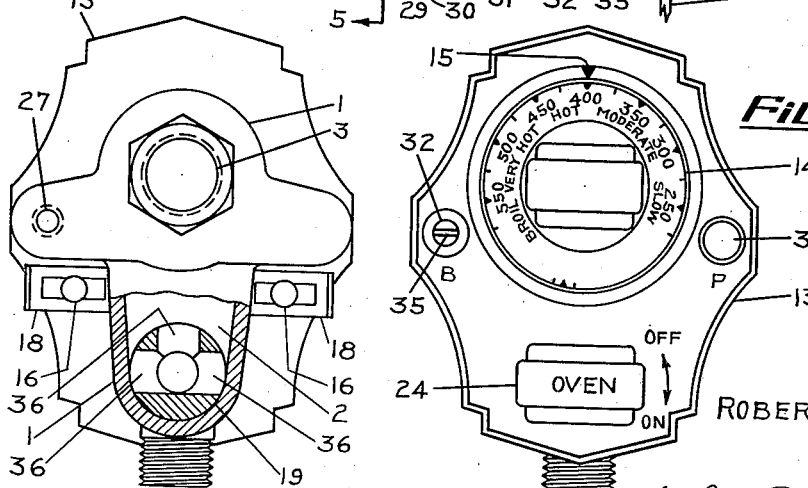
Inventor
ROBERT E. NEWELL
By John R. Shipman
Attorney Patented July 20, 1937

2,087,443

UNITED STATES PATENT OFFICE 2,087,443

OVEN CONTROL UNIT

Robert E. Newell, Irwin, Pa., assignor to Robertshaw Thermostat Company, Youngwood, Pa., a corporation of Pennsylvania Application February 24, 1937, Serial No. 127,457

9 Claims. (Cl. 236—15)

This invention relates to a control unit for a gas oven and more particularly to a plurality of valves combined into a unit of compact construction and pleasing appearance which is arranged for exceptional convenience in adjusting and operating the valves.

An object of this invention is to provide a control unit consisting of a thermostat, a valve operated thereby for controlling the fuel supply to the oven and a by-pass valve and/or a pilot passage valve with the individual means for manual adjustment thereof arranged to be accessible from in front of the panel plate through which the temperature adjusting dial extends.

Another object is to produce a unit having a casing enclosing thermally responsive means with a temperature adjusting dial at the front of the casing and at the rear, a housing for the main, thermally-operated valve and also the by-pass and pilot passage valves. These secondary valves are to be so arranged and positioned that the stems for adjusting same may be extended forwardly towards the plate through which the dial extends, the plate being arranged to permit adjustment of the stems from in front thereof.

An additional purpose of this invention is to provide such a unit in which the dial, thermostat casing and the valve housing is arranged on a common axis with the housing adapted to allow the attachment thereto of a gas cock in such a manner that its longitudinal axis is substantially parallel to the aforementioned common axis with the gas cock handle positioned in front of the panel plate.

A further object is to construct the valve housing and gas cock so that the cock can be attached to the housing in any one of a plurality of rotary positions and still maintain proper control of the fuel supply.

The control unit illustrated and described is particularly designed and adapted for use with the oven of a domestic gas range. In the past, the dial of the thermostat and the handle of the gas cock have often been grouped together, especially since the advent of the bellows type of oven thermostat with the accompanying custom of mounting the thermostat on the front panel along with the top burner gas cocks. However, the usual position of the by-pass and pilot valves was such that adjustment thereof had to be accomplished from the rear. Then with the control mounted on the front panel, the operator, to adjust the by-pass, had to remove a top burner and reach through the top burner compartment to engage the valve adjusting stem with a tool. After turning the valve, he had to disengage his tool and bend over to view the result in the oven. If the result was unsatisfactory, as it often was, he then had to straighten up, lean over and reach through the top burner compartment and try again. And again he would have to bend over to view the results in the oven. Upon obtaining the proper by-pass adjustment the routine would have to be repeated to adjust the pilot valve. It is easily understandable that the process outlined would sometimes prove irksome to the person making the adjustment with an inaccurate adjustment resulting.

The inconvenience to the person making these adjustments is possibly even greater when the control is mounted on the "fence" at the rear of the range. This fact is obvious as the rear of the range is nearly always positioned against a wall.

In accordance with the present invention, the foregoing difficulties are eliminated. The dial and gas cock handle are pleasingly grouped to appear on a panel plate and the by-pass and pilot valve are so positioned that their adjusting stems extend forwardly toward the plate which is arranged to permit access to said stems from the front of the range. In the device illustrated, small openings are provided in the plate in line with the adjusting stems and are concealed by readily removable covers. Once the cover is removed and the stem engaged by the tool, the operator may look into the oven at the same time the adjustment is being made. Under these conditions it is apparent that it is much easier to obtain a proper adjustment. Thus not only is the adjusting means for these secondary valves more accessible, but the resulting adjustment is quicker, easier and more accurately accomplished.

By my invention, a compact control unit is provided with a gas cock a part of the unit but still independent enough to be completely detachable from the unit. The unit is also arranged so that the inlet of the cock may be in any one of several rotary positions which increases the flexibility of mounting.

The manner in which the aforementioned and other objects and advantages are obtained will be discussed in more detail hereinafter with reference to the accompanying drawing, in which:—

Figure 1 is a side elevation of a preferred type of control unit with a portion thereof broken away;

Figure 2 is a bottom view of the structure shown in Figure 1;

Figure 3 is a front end view, with one of the covers removed;

Figure 4 is a rear view broken along line 4A—4A of Fig. 1; and

Figure 5 is a view taken along line 5—5 of Figure 2.

In the drawing, a valve housing is indicated generally by the member 1 and has a main passage therethrough from inlet 2 through outlet 3. The outlet is arranged for connection to a gas oven burner which is not shown. A tubular casing 4 mounted on housing 1 encloses a bellows assembly similar to that shown and described in United States Patent No. 1,998,818 issued to Robert E. Newell, Wm. B. Mackintosh and Clarence W. Robertshaw. The bellows assembly need not be fully described herein as it will be sufficient for the purpose at hand to state that the bellows 6 is connected by the capillary tube 7 to a bulb 8 which is located in the oven 9. The bulb, tube and bellows are filled with a suitable thermally-responsive fluid and the bellows assembly is so arranged that upon a rise in the temperature of the oven, the bellows will be expanded and, acting through the assembly, cause the gland pin 10 to operate the main valve 11. A spring 12 constantly tends to hold the valve 11 against its seat.

Mounted at the front end of casing 4 and extending through a panel plate 13 is a temperature adjusting dial 14 with appropriate indicia marked thereon for cooperation with a pointer 15 on the panel plate. Dial 14 is associated with valve 11 and bellows 6 so that rotation of the dial varies the temperature at which the valve will be operated. As shown in the drawing, the dial, bellows and valve are aligned on a common axis.

The panel plate 13 is secured to a panel of the range, shown by dotted lines 17, by studs 16 and clips 18. The range panel is, of course, provided with an opening sufficient to clear the dial, gas cock, and adjusting stems to be later described. Of course, the panel plate may be dispensed with and the range panel itself arranged to serve instead.

The valve housing 1 is so constructed and designed that the gas cock consisting of a casing 19 and a plug 20, is easily attached thereto by a nut 21. The arrangement is such that the cock may be attached to the housing in various rotary positions with the longitudinal axis of the cock substantially parallel to the common axis of the dial, bellows and main valve. The gas cock has an inlet 22 and a plurality of outlets 36 arranged radially about the longitudinal axis of the cock so that at least one of the outlets is in communication with the inlet 2 of the housing in each position in which the cock may be mounted. The operating stem 23 of the cock extends through the panel plate directly below the dial. A handle 24 is secured to the stem 23 in front of the plate 13 and appropriate markings indicate the off and on positions of the gas cock.

In addition to the main passage through the housing 1 from the inlet 2, past valve 11, to the outlet 3, there are two secondary passages therein. The first, known as the by-pass 25, leads from the inlet passage 2, around valve 11, to the outlet 3. The purpose of this passage is to insure at least a small flow of fuel to the burner, regardless of the position of the valve 11 as long as the gas cock is turned on. The second, known as the pilot line passage 26, leads from the inlet 2, around valve 11, to a tapped outlet 27 to which the pilot line is to be attached.

A pair of identical valves, a by-pass valve 28 and a pilot line valve 29, are also enclosed by the housing 1, one on each side of the main valve 11. These valves are arranged to regulate the flow of gas in the by-pass and pilot line, respectively, and are of the slotted plug type having an axial bore so that rotation of the plug regulates the flow as can be seen in Figure 5. Each of these secondary valves is provided with packing 30, a packing nut 31 and an adjusting stem 32. Mounting of these valves is such that their adjusting stems may be extended alongside and substantially parallel to the casing 4 to a point directly behind the panel plate 13. A pair of small openings 34 provided in the panel plate 13 directly in line with the stems 32 are concealed by easily removable covers 33. The covers are equipped with spring extensions which grip the walls of the openings to hold the covers in place. The openings 34 are just large enough to permit insertion therethrough of a screw driver for engagement with the slot 35 in the ends of stems 32. Beneath the appropriate cover is marked on the panel plate the letter B for by-pass or the letter P for pilot line to designate the adjustment accessible through that opening.

One of the advantages of the structure described which is not apparent at first is the fact that the gas cock is detachable from the thermostatic valve housing. Therefore, if need be, the thermostat may be removed for servicing without disturbing the gas cock. Consequently, if the thermostatic part of the unit needs repair, it is not necessary to shut off the gas to the entire range, as the oven gas cock may remain in the system to prevent leakage and the remainder of the range be used as before.

In my device, the cock and adjusting stems are mounted substantially parallel to the axis of the dial, bellows and valve. In this manner, an inexpensive and compact unit is obtained. The unit has a temperature adjusting dial and gas cock handle closely associated on a panel plate having removable covers concealing small openings through which access may be gained to the manual adjustment stems of the by-pass and pilot line valves. The tremendous advantages of such a structure in the ease, convenience and accuracy of the adjustment of the valves has been described hereinbefore.

It is believed that the benefits to be gained by having the gas cock attachable in various positions will be obvious when the adaptability of the unit for installation in different ranges is considered. As described, the inlet may be located in the most suitable position for connection to the manifold of the range.

Although a preferred embodiment has been shown and described, it is to be understood that I do not wish to be limited to the details of the disclosed device except within the scope of the accompanying claims.

I claim:

1. In a control unit for a gas range oven having a main burner and a pilot burner, a valve body having a horizontally arranged main gas outlet passage opening to the rear, a vertically arranged inlet passage joining the outlet passage to form a substantially L-shaped main gas passage, a main valve seat in said outlet passage; the body also having two opposite, lateral and horizontal extensions parallel to the outlet passage, one of the extensions having a horizontal pilot gas passage therein opening to the rear, a cross passage from said inlet passage to the pilot passage, the opposite extension having therein a horizontal by-passage, cross passages connecting the by-passage to both the main outlet and inlet passages, a main valve operating stem receiving bore extending forwardly through the body and concentric with the main valve seat and outlet passage; valves for said valve body comprising a main valve adapted to cooperate with said main valve seat and to be operated by a stem extending forwardly through said bore, a pilot valve in said pilot passage having a stem extending forwardly from said body, and a valve in said by-passage also having a stem extending forwardly from said body, the three stems being axially aligned with their respective gas passages and parallel with each other; a tubular casing attached to said body concentric with the main valve stem, thermally responsive means in said casing for actuating said main valve stem, said by-passage and pilot valves' stems being positioned without the circumference of said casing, and temperature adjusting means at the front of said casing associated with said thermally responsive means, the valve body and casing being mounted behind and substantially concealed by a panel on said range, said panel having means permitting manual operation of said adjusting means and said by-passage and pilot valves' stems from directly in front of the panel, whereby is produced a conveniently operated control unit of compact form having easily machined elements.

2. In a control unit for a gas range oven having a main burner and a pilot burner, a valve body having a main, vertically arranged inlet passage, a main, horizontally arranged passage opening to the rear and joining said inlet passage to form a substantially L-shaped main gas passage, a centrally bored nipple mounted in said main horizontal passage and adapted for use as the main gas outlet; the body also having a main control valve operating stem receiving bore extending forwardly through the body concentric with said horizontal passage, two additional horizontal bores from the front parallel to the main horizontal passage for use as a pilot passage and a by-passage, said pilot passage having an opening to the rear, a cross passage from the inlet passage to the pilot passage, cross passages establishing communication between the by-passage and both the main inlet and outlet; valves for said valve body comprising a control valve in said main passage adapted to be operated by a stem extending forwardly through its afore-mentioned bore, a valve spring engaging said control valve and supported by said nipple, a pilot valve in said pilot passage having a stem extending forwardly from said body, a valve in said by-passage also having a stem extending forwardly from said body, the three stems being axially aligned with their respective gas passages and parallel with each other, and means for sealing the forward end of each bore having a front opening to prevent the escape of gas therethrough; a tubular casing attached to said body concentric with said control valve stem, thermally responsive means in said casing for actuating said control valve stem, said by-passage and pilot valves' stems being positioned without the circumference of said casing, the valve body and casing being mounted behind and substantially concealed by a panel on said range, and temperature adjusting means at the front of said casing associated with said thermally responsive means and including a dial extending in front of said panel, said panel having means permitting the manual operation of said by-passage and pilot valves' stems from directly in front of the panel, whereby is produced a conveniently operated control unit of compact form having easily machined elements.

3. A control unit as set forth in claim 2 in which the body has a horizontal bore therethrough intersecting the lower end of said inlet passage and which also includes a gas cock comprising a stator having an inlet and an outlet, a rotor completely supported by said stator for cutting off the flow therethrough, and a stem connected to said rotor for operating same, said stator having an end portion containing the outlet and adapted to fit into said bore with the outlet registering with the body inlet passage, and means for removably clamping said body in place on said end portion with the axis of said cock substantially parallel to said tubular casing, said rotor stem extending through said panel substantially parallel to said by-passage and pilot valves' stems, and an operating handle mounted on said rotor stem in front of said panel.

4. In a control unit for a gas burner, a valve body having inlet and outlet passages, a valve in said body for controlling the flow therethrough, thermally responsive means carried by the body for operating said valve, said body having a bore intersecting the inlet passage, a gas cock comprising a stator having an inlet and an outlet and a rotor completely supported by said stator for cutting off the flow between the stator inlet and outlet, said stator having an end portion containing the outlet and adapted to extend through said bore with the outlet registering with the body inlet passage, and means for removably clamping said valve body in place on said end portion, said means including an annular shoulder formed on said stator abutting against said body at one end of said bore and a removable nut mounted on said stator and abutting against said body at the other end of said bore, whereby the portion of the unit consisting of the valve body, valve and thermally responsive means may be easily removed without disturbing said gas cock.

5. In a control unit for a gas burner, a valve body having inlet and outlet passages, a valve in said body for controlling the flow therethrough, thermally-responsive means for operating said valve, said body having a bore intersecting the inlet passage, a gas cock comprising a stator having an inlet and an outlet and a rotor completely supported by said stator for cutting off the flow between the stator inlet and outlet, said stator having a reduced end portion adapted to extend through said bore and forming an annular shoulder for abutting against said body at one end of said bore, said end portion containing the stator outlet and having its extreme end threaded to receive a removable nut, said nut having a shoulder adapted to abut against the valve body at the other end of the bore, whereby said body is removably clamped in place on said end portion with the body inlet passage registering with the stator outlet.

6. A unit as set forth in claim 4 in which the stator has a lateral extension containing the stator inlet, and in which said clamping means enables positioning of said body on said end portion in a plurality of rotary positions, the stator being so formed that communication between the stator inlet and the body inlet may be maintained in each position of the body on said end portion, whereby the unit may also be used in various installations requiring different relative stator inlet positions.

7. In a control unit for a gas range oven having a main burner and a pilot burner, a valve housing having a horizontally arranged main gas outlet passage opening to the rear, a vertically arranged inlet passage joining the outlet passage to form a substantially L-shaped main gas passage, a main valve seat in said outlet passage, the housing also having two opposite, lateral and horizontal extensions substantially parallel to the outlet passage, one of the extensions having a horizontal pilot gas passage therein opening to the rear, a cross passage from said inlet passage to the pilot passage, the opposite extension having therein a horizontal by-passage, cross passages connecting the by-passage to both the main outlet and inlet passages, a main valve operating stem receiving bore extending forwardly through the housing and concentric with the main valve seat and outlet passage; a main valve adapted to cooperate with said main valve seat and to be operated by a stem extending forwardly through said bore, a pilot valve in said pilot passage having an adjusting stem extending forwardly from said body, a valve in said by-passage also having an adjusting stem extending forwardly from said body, the three stems being axially aligned with their respective gas passages and substantially parallel with each other, thermally responsive means concentric with said main valve stem for actuating same and mounted within a tubular enclosure carried by said housing, said by-passage and pilot valves' stems being positioned without said enclosure, said housing also having a vertical extension containing said inlet passage, a gas cock for delivering gas to said inlet passage comprising a stator and a rotor carried by said stator for cutting off the flow therethrough, said rotor having an operating stem, means for removably clamping said stator to said vertical housing extension with said rotor stem extending forwardly substantially parallel to said by-passage and pilot valves' stems, said housing and gas cock being mounted behind a panel on said range with all of the aforementioned elements being substantially concealed thereby, temperature adjusting means associated with said thermally responsive means and including a manually operated dial extending in front of said panel, a handle mounted on the end of said rotor stem in front of said panel for manual operation of said gas cock, said panel having means permitting the manual operation of said by-passage and pilot valves' stems from directly in front of said panel, whereby is produced a conveniently operated control unit of compact form.

8. In a control unit for a gas range oven having a main burner and a pilot burner, a valve housing having a horizontally arranged main gas outlet passage opening to the rear, a vertically arranged inlet passage joining the outlet passage to form a substantially L-shaped main gas passage, a main valve seat in said outlet passage, a main valve adapted to cooperate with said seat, a bore concentric with said seat and outlet passage and extending forwardly through said housing, a main valve operating stem connected with said valve and extending forwardly through said bore, thermally responsive means concentric with said main valve stem and connected with the forward end thereof to actuate same, said means being mounted within a tubular enclosure carried by said housing, said housing being formed to accommodate two additional horizontal bores from the front alongside and substantially parallel to the main horizontal outlet passage and outside the circumference of said tubular enclosure, one of said additional bores being adapted for use as a by-passage and the other as a pilot passage, said pilot passage having a tapped opening adapted to receive a pilot line fitting, a cross passage from the inlet passage to the pilot passage, cross passages establishing communication between the by-passage and both the main inlet and outlet passages, a pilot valve in said pilot passage having an adjusting stem extending forwardly from said housing, a valve in said by-passage also having an adjusting stem extending forwardly from said housing, said two adjusting stems being axially aligned with their respective gas passages and parallel with each other and with said tubular enclosure, said housing being mounted behind a panel on said range with the tubular enclosure substantially perpendicular to said panel and with all the aforementioned elements substantially concealed thereby, temperature adjusting means associated with said thermally responsive means and including a manually operated dial extending in front of the panel, said panel being provided with means permitting the manual operation of said by-passage and pilot valves' stems from directly in front of the panel, whereby is produced a conveniently operated control unit of compact form.

9. A unit as set forth in claim 8 which also includes a gas cock for delivering gas to said inlet passage and comprising a stator and a rotor carried by said stator, means for clamping said stator directly to said housing with the axis of said cock substantially parallel to the tubular enclosure, said rotor having an operating stem extending along said cock axis through the panel, and a manually operated handle mounted on the end of said stem in front of the panel and adjacent said dial.

ROBERT E. NEWELL.